(12) United States Patent
Hoshi (10) Patent No.: US 6,729,305 B2
(45) Date of Patent: May 4, 2004

(54) FUEL INJECTION AMOUNT CONTROL APPARATUS AND METHOD FOR INTERNAL COMBUSTION ENGINE

(75) Inventor: Koichi Hoshi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 95 days.

(21) Appl. No.: 10/124,479

(22) Filed: Apr. 18, 2002

(65) Prior Publication Data

US 2002/0157652 A1 Oct. 31, 2002

(30) Foreign Application Priority Data

Apr. 27, 2001 (JP) ........................................ 2001-133355

(51) Int. Cl.⁷ ................................................ G05D 1/00
(52) U.S. Cl. ...................................... 123/491; 701/104
(58) Field of Search ................................ 123/491, 478, 123/179.16, 179.18, 674, 339.19, 339.23; 701/104

(56) References Cited

U.S. PATENT DOCUMENTS 6,481,405 B2 * 11/2002 Fujino et al. ............ 123/179.3

FOREIGN PATENT DOCUMENTS

| JP | A 9-53490 | 2/1997 |
|----|-----------|--------|
| JP | A 9-324678 | 12/1997 |
| JP | A 11-229925 | 8/1999 |

* cited by examiner

Primary Examiner—Mahmoud Gimie
Assistant Examiner—Arnold Castro
(74) Attorney, Agent, or Firm—Oliff & Berridge, PLC

(57) ABSTRACT

An apparatus for controlling the amount of fuel injected into an internal combustion engine corrects the startup-time amount of air based on a required amount of air that is the amount of air needed to maintain a predetermined value of rotation speed of the engine during an idling operation after a warm-up of the engine, and computes a startup-time fuel injection amount based on a predetermined startup-time engine operation state that is other than the amount of air, and corrects the computed startup-time fuel injection amount based on the ratio between the present idling-time required amount of air and the idling-time required amount of air under a new-vehicle condition.

9 Claims, 6 Drawing Sheets

FUEL INJECTION AMOUNT CONTROL APPARATUS AND METHOD FOR INTERNAL COMBUSTION ENGINE

INCORPORATION BY REFERENCE

The disclosure of Japanese Patent Application No. 2001-133355 filed on Apr. 27, 2001 including the specification, drawings and abstract is incorporated herein by reference in its entirety.

BACKGROUND OF THE INVENTION

1. Field of the Invention

The invention relates to an apparatus and a method for controlling the amount of fuel injected into an internal combustion engine and, more particularly, to an apparatus and a method for controlling the amount of fuel injected into an internal combustion engine at the time of startup of the engine.

2. Description of the Related Art

When an internal combustion engine is started, that is, cranked, the amount of air taken into the engine is small and the intake pipe pressure is unstable, so that the amount of intake air cannot be accurately measured or estimated. Therefore, at the time of startup of the engine, a basic amount of fuel injected into engine is computed based on the temperature of cooling water of the engine, regardless of the amount of intake air. The basic amount of fuel injected at the time of startup of the engine is increased if the engine temperature is low, because lower engine temperature makes less likely the vaporization of fuel attached to a wall surface of the intake pipe. The basic amount of fuel injection is then corrected based on the engine rotation speed, the battery voltage, the ambient pressure, etc., so as to determine a final amount of startup fuel injection.

For example, Japanese Patent Application Laid-Open No. 9-53490 discloses a control apparatus that avoids an event that if the cranking rotation speed of an internal combustion engine becomes high at the time of very low engine temperature, the fuel vaporization rate increases and the air-fuel ratio in the intake pipe becomes an over-rich ratio so that the startup characteristic of an internal combustion engine deteriorates, by shifting a curve that determines a correction factor for correcting the startup-time basic fuel injection amount based on the engine rotation speed toward a lower engine rotation speed side at the time of very low engine temperature and therefore starting the correction of engine rotation speed at a lower rotation speed at the time of very low engine temperature than at the time of normal engine temperature.

As described above, the amount of fuel injected at the time of startup of the internal combustion engine is computed based on environmental conditions (atmospheric pressure and the like) and the states of the engine (cooling water temperature, rotation speed, battery voltage, etc.) at the time of startup. Thus, the startup-time fuel injection amount is basically a fixed amount of fuel injection that is independent of the amount of intake air. The amount of intake air at the time of startup of the internal combustion engine is determined by correcting an engine cooling water temperature-based startup-time basic amount of air through the use of a learned value of required amount of air (during idling) acquired by learning an amount of air needed to maintain a predetermined value of rotation speed of the engine during an idling operation subsequent to a warm-up of the engine.

The friction of the engine and the drive system of a vehicle gradually decreases from the levels of a new vehicle state. Therefore, the amount of air needed to maintain a certain idling rotation speed after a warm-up of the engine tends to gradually decrease from the new vehicle-state level. The amount of air needed during such a hot idling operation changes depending on the status of deposit on the throttle valve and the idling rotation speed control valve.

Since the startup-time amount of air is corrected based on the idling-time required amount of air as mentioned above, the startup-time amount of air changes in accordance with the idling-time required amount of air. Therefore, if a startup-time fuel injection amount is computed based on environmental conditions and states of the engine excluding the amount of intake air, the air-fuel ratio at the time of startup of the engine changes as the startup-time amount of air changes with changes in the idling-time required amount of air. Hence, the startability of the engine at the time of starting up the engine cannot be made stable. Furthermore, in view of reduction of HCs discharged from an engine at the time of a cold startup, stabilization of the air-fuel ratio at the time of startup of the engine has become an important issue.

SUMMARY OF THE INVENTION

Accordingly, it is an object of the invention to provide a startup-time fuel injection amount control apparatus for an internal combustion engine which is capable of correcting a startup-time fuel injection amount in accordance with changes in the amount of intake air at the time of startup of the engine.

In order to achieve the aforementioned object, a control apparatus for controlling an amount of fuel injected into an internal combustion engine in accordance with an aspect of the invention and a control method thereof determine a required amount of air introduced into the internal combustion engine which is needed to maintain a predetermined value of rotation speed of the internal combustion engine during an idling operation after a warm-up of the internal combustion engine, and control the amount of air introduced into the internal combustion engine at a startup time of the internal combustion engine in accordance with the required amount of air, and control the amount of fuel injected into the internal combustion engine at the startup time of the internal combustion engine based on at least the required amount of air.

In general, if the amount of air needed to maintain a constant idling rotation speed of an internal combustion engine changes, the amount of air introduced into the internal combustion engine at the time of a startup of the engine also changes. According to the above-described control apparatus of the invention, the startup-time fuel injection amount is corrected in accordance with changes in the required amount of air during an idling operation of the engine, so that the startup characteristic of the internal combustion engine can be improved.

In the above-described apparatus of the invention, the amount of fuel injected into the internal combustion engine may be computed based on a startup-time internal combustion engine state that is other than the amount of air introduced into the internal combustion engine, and the computed amount of fuel injected may be corrected based on a ratio of a present idling-time required amount of air and an idling-time required amount of air in a new-vehicle condition.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
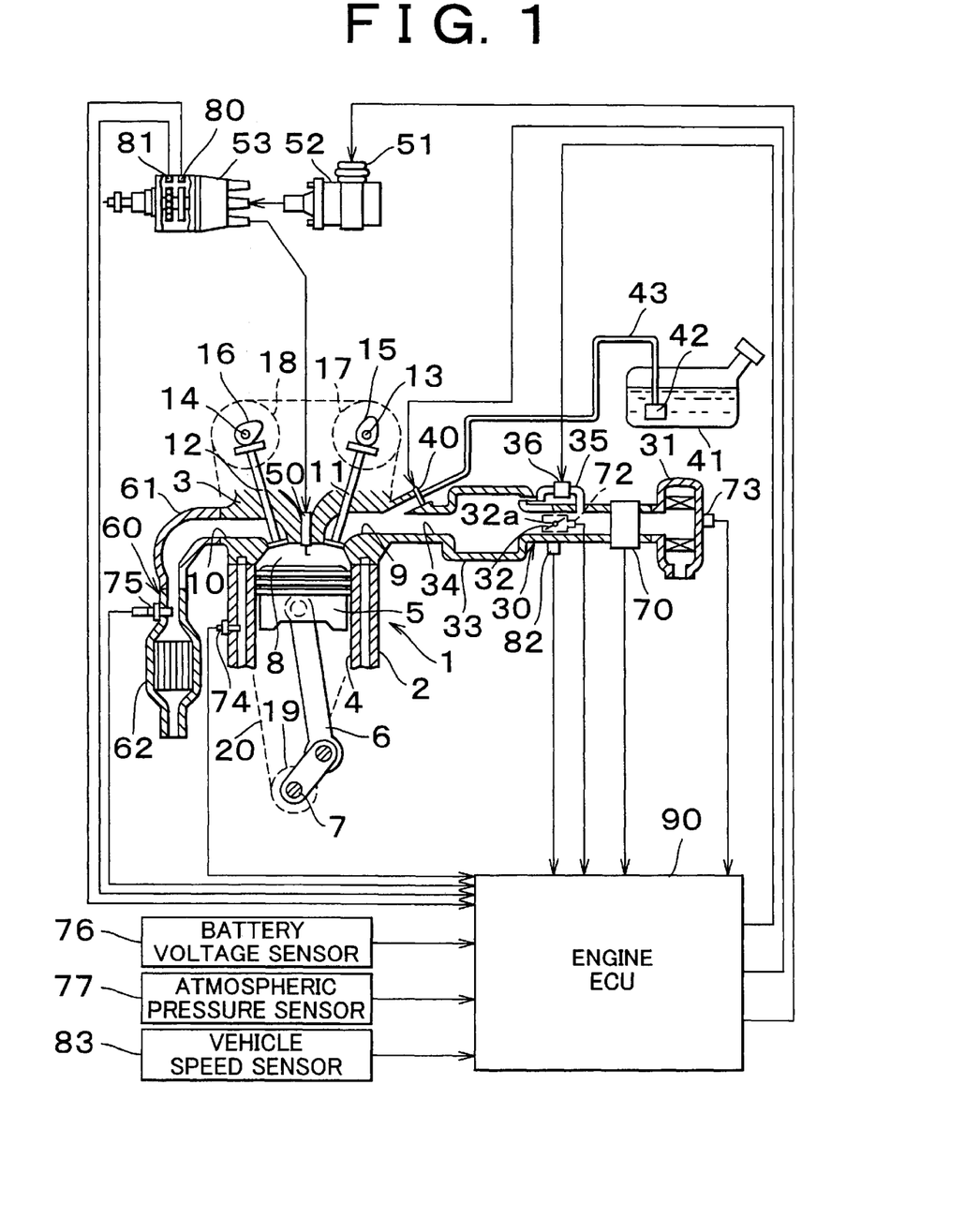
FIG. 1 is a schematic diagram illustrating an overall construction of an electronically controlled internal combustion engine equipped with a startup-time fuel injection amount control apparatus in accordance with an embodiment of the invention.

FIG. 1 is a schematic diagram illustrating an overall construction of an electronically controlled internal combustion engine equipped with an apparatus that controls the amount of fuel injected at the time of startup of the engine in accordance with an embodiment of the invention. An internal combustion engine 1 is an in-line 4-cylinder four-stroke cycle reciprocating gasoline engine installed in a vehicle. The engine 1 has a cylinder block 2 and a cylinder head 3. The cylinder block 2 has four cylinders 4 that extend side by side in up-down directions. In each cylinder 4, a piston 5 is provided for reciprocating movements. Each piston 5 is connected to a common crankshaft 7 via a connecting rod 6. Reciprocating movements of the pistons 5 are converted into rotating movements of the crankshaft 7 via the connecting rods 6.

A combustion chamber 8 is formed above each piston 5 between the cylinder block 2 and the cylinder head 3. The cylinder head 3 has intake ports 9 and exhaust ports 10 that connect the combustion chambers 8 and outside faces of the cylinder head 3 in communication. To open and close the ports 9 and 10, intake valves 11 and exhaust valves 12 are supported by the cylinder head 3 for reciprocating movements substantially in the up-down directions. On the cylinder head 3, an intake-side camshaft 13 and an exhaust-side camshaft 14 are rotatably provided above the valves 11 and 12. The camshafts 13 and 14 are provided with cams 15 and 16 for driving the valves 11 and 12, respectively. Timing pulleys 17 and 18 provided at end portions of the camshafts 13 and 14, respectively, are connected to a timing pulley 19 provided at an end portion of the crankshaft 7 via a timing belt 20.

An intake passage 30 is connected to the intake ports 9. The intake passage 30 is provided with an air cleaner 31, a throttle valve 32, a surge tank 33, an intake manifold 34, etc. Air outside the engine 1 (external air) passes sequentially through portions 31, 32, 33 and 34 of the intake passage 30 toward the combustion chambers 8. The throttle valve 32 is provided pivotably on a shaft 32a in the intake passage 30. The shaft 32a is connected to an accelerator pedal (not shown) in a driver-side space via a wire or the like. In accordance with the depressing operation performed on the accelerator pedal by a driver, the shaft 32a turns together with the throttle valve 32 as one unit. The amount of air that flows through the intake passage 30 is determined in accordance with the inclined angle of the throttle valve 32. An idling adjust passage 35 that bypasses the throttle valve 32 is provided with an idling rotation speed control valve (ISCV) 36 for adjusting the amount of flow of air at the time of an idling operation. The intake manifold 34 is provided with injectors 40 that inject fuel toward the intake ports 9. Fuel is stored in a fuel tank 41, and is pumped therefrom by a fuel pump 42 so as to be supplied to the injectors 40 via a fuel piping 43. Mixture of fuel injected from the injectors 40 and air flowing through the intake passage 30 is introduced into the combustion chambers 8 via the intake valves 11.

To ignite the air-fuel mixture, the cylinder head 3 is provided with ignition plugs 50. At the time of ignition, an igniter 51 receives an ignition signal, and controls supply and discontinuation of a primary electric current through an ignition coil 52, so that a secondary current is supplied to an ignition plug 50 via an ignition distributor 53.

After combustion of a mixture gas, exhaust gas is led to the exhaust port 10 via the exhaust valve 12. An exhaust passage 60 that includes an exhaust manifold 61, a catalytic converter 62, etc., is connected to the exhaust ports 10. The catalytic converter 62 contains a three-way catalyst that accelerates both the oxidation of HCs (hydrocarbons) and CO (carbon monoxide) that are unburned components and the reduction of NOx (nitrogen oxides) produced by reactions between nitrogen from air and residual oxygen. Therefore, after being cleaned by the catalytic converter 62, exhaust gas is emitted into the atmosphere.

Various sensors are attached to the engine 1. A water temperature sensor 74 for detecting the temperature of cooling water of the engine 1 is attached to the cylinder block 2. An air flow meter 70 for detecting the amount of flow or air is provided in the intake passage 30. Provided near the throttle valve 32 in the intake passage 30 is a throttle opening sensor 72 for detecting the turning angle of the shaft of the throttle valve 32 (degree of throttle opening). When the throttle valve 32 is in a completely closed state, an idle switch 82 becomes on and a complete throttle closure signal output from the idle switch 82 becomes active. An $O_2$ sensor 75 for detecting whether the air-fuel ratio of exhaust gas is on the rich side or the lean side of the stoichiometric air-fuel ratio is provided in the exhaust passage 60 upstream of the catalytic converter 62.

The distributor 53 contains two rotors that rotate synchronously with rotation of the crankshaft 7. The distributor 53 also has a reference crank position sensor 80 that generates a reference position detecting pulse at every 720° CA in terms of crank angle (CA) based on the rotation of one of the rotors in order to detect a reference position of the crankshaft 7. The distributor 53 further has a crank angle sensor 81 that generates a rotation speed detecting pulse at every 30° CA based on the rotation of the other rotor in order to detect the rotation speed of the crankshaft 7. The vehicle has a vehicle speed sensor 83 that generates a number of output pulses per unit time that is proportional to the rotation speed of an output shaft of a transmission, that is, the vehicle speed. The vehicle also has a battery voltage sensor 76 for measuring the voltage of a battery, and an atmospheric pressure sensor 77 for detecting the atmospheric or ambient pressure.

An engine electronic control unit (engine ECU) 90 is a microcomputer system that executes a fuel injection control, an ignition timing control, an idling rotation speed control, etc. In the idling rotation speed control, the engine ECU 90 detects an idling state of the engine 1 based on the complete throttle closure signal from the idle switch 82 and the vehicle speed from the vehicle speed sensor 83. Furthermore, the engine ECU 90 compares a target engine rotation speed determined by the engine cooling water temperature from the water temperature sensor 74 and the like with an actual engine rotation speed. The engine ECU 90 determines a control amount in accordance with the difference between the target and actual engine rotation speeds so that the actual engine rotation speed reaches the target engine rotation speed. The engine ECU 90 controls the ISCV 36 to adjust the amount of air so as to maintain an optimal idling rotation speed.

In the idling rotation speed control, the engine ECU 90 performs a learning control besides the aforementioned feedback control, in order to facilitate maintenance of a constant value of the idling rotation speed. That is, an idling-time required amount of air QG that is an amount of air presently needed to maintain a predetermined value of engine rotation speed during an idling operation after a warm-up of the engine is learned and updated during the feedback control. In particular, in a new-vehicle condition (where the cumulative travel distance of the vehicle is less than or equal to a predetermined value), the amount of air needed to maintain a predetermined value of idling rotation speed after a warm-up of the engine is learned and updated also as an idling-time required amount of air QGST under the new-vehicle condition.

Normally at the time of startup of an engine, the amount of flow of air cannot be precisely measured due to the effect of pulsation of the amount of intake air or the like. In the internal combustion engine of this embodiment, the startup-time amount of air QCAL is determined as follows:

QCAL←QSTA+QG+QTHW+other correction term where QSTA is the startup-time basic amount of air; QG is the post-warm-up idling-time required amount of air; and QTHW is a correction term based on the water temperature THW.

Figure 2:
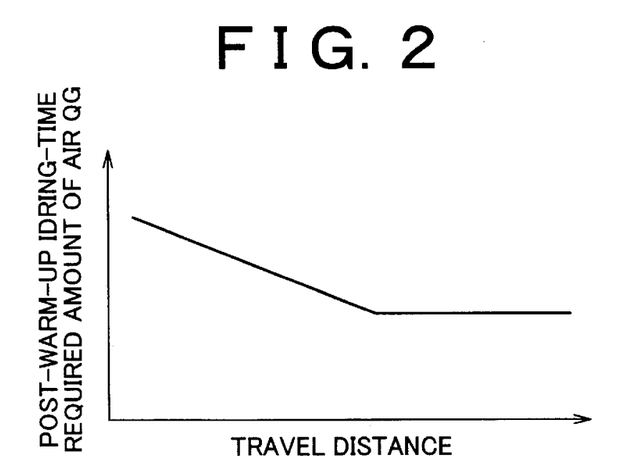
FIG. 2 is a characteristic graph indicating a relationship between the cumulative travel distance of the vehicle and the post-warm-up idling-time required amount of air QG.

Such a relationship between the idling-time required amount of air QG after a warm-up operation of the internal combustion engine and the cumulative travel distance of the vehicle is indicated in FIG. 2. As indicated in FIG. 2, as the cumulative travel distance of the vehicle increases, the friction of the engine and the drive system decreases, and the amount of air QG needed to maintain a constant idling rotation speed decreases. Therefore, the startup-time amount of air QCAL determined by the aforementioned mathematical formula also decreases.

In contrast, according to the conventional art, the fuel injection amount TAUST at the time of a startup of an internal combustion engine is determined, for example, by:

TAUST←TAUSTB*KNEST*KBST*(PA/760)

where:
TAUSTB is the startup-time basic fuel injection amount based on cooling water temperature;
KNEST is a correction factor based on the rotation speed of the engine;
KBST is a correction factor based on the battery voltage; and
PA is the atmospheric pressure.

Thus, the fuel injection amount TAUST is independent of the amount of air.

Figure 3:
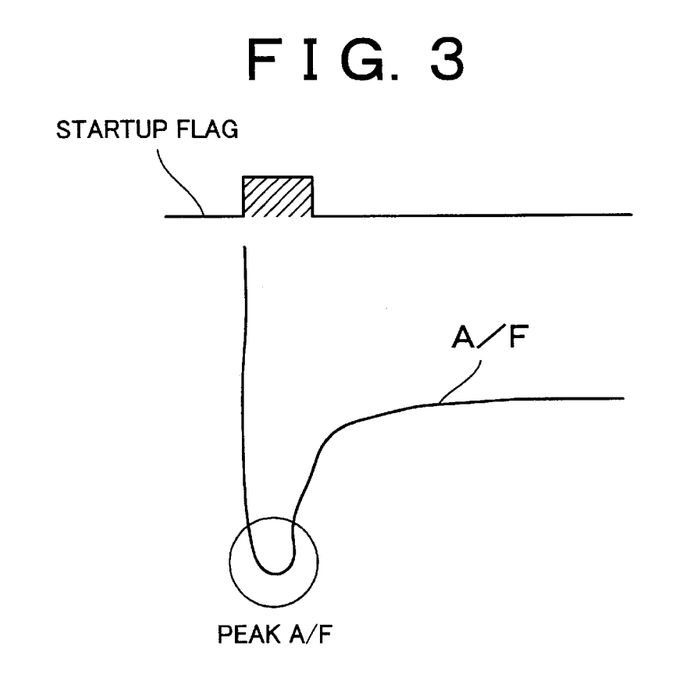
FIG. 3 is a time chart indicating changes in the air-fuel ratio (A/F) at the time of a startup of the engine.
Figure 4:
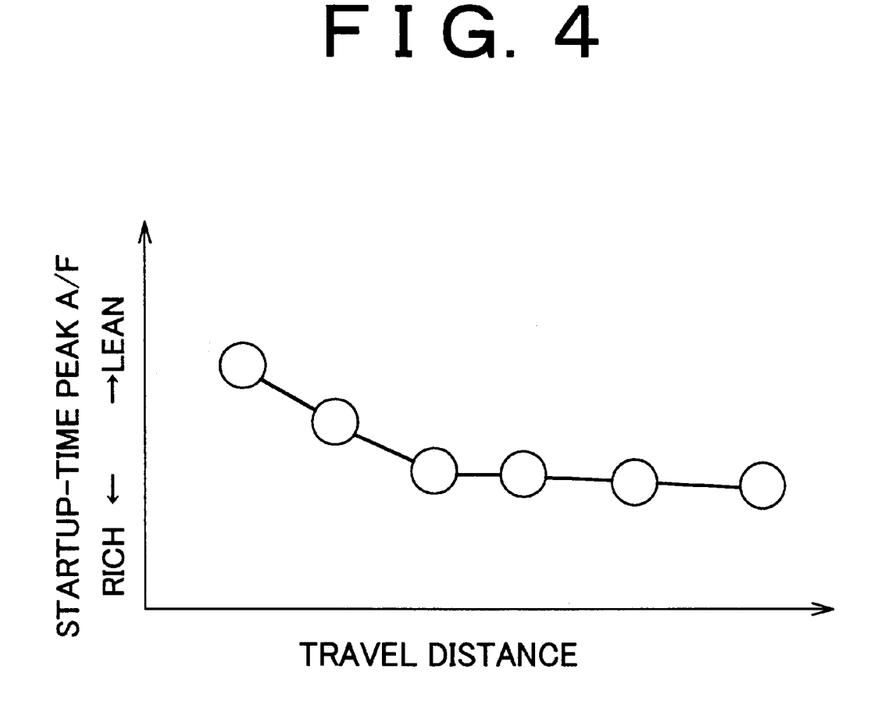
FIG. 4 is a characteristic graph indicating a relationship between the cumulative travel distance and the peak A/F at the time of a startup of the engine.

At the time of startup of the internal combustion engine, a large amount of fuel is supplied to the intake manifold 34 via the fuel piping 43, and the air-fuel ratio in the intake manifold 34 exhibits a peak A/F on the rich side as indicated in FIG. 3. In a case where although the startup-time amount of air decreases with increases in the cumulative travel distance, the startup-time fuel injection amount is controlled independently of the startup-time amount of air, the peak A/F shifts to the rich side as indicated in FIG. 4, so that degraded emission results. In the invention, therefore, a new correction factor is incorporated to correct the startup-time fuel injection amount as described below.

Figure 5:
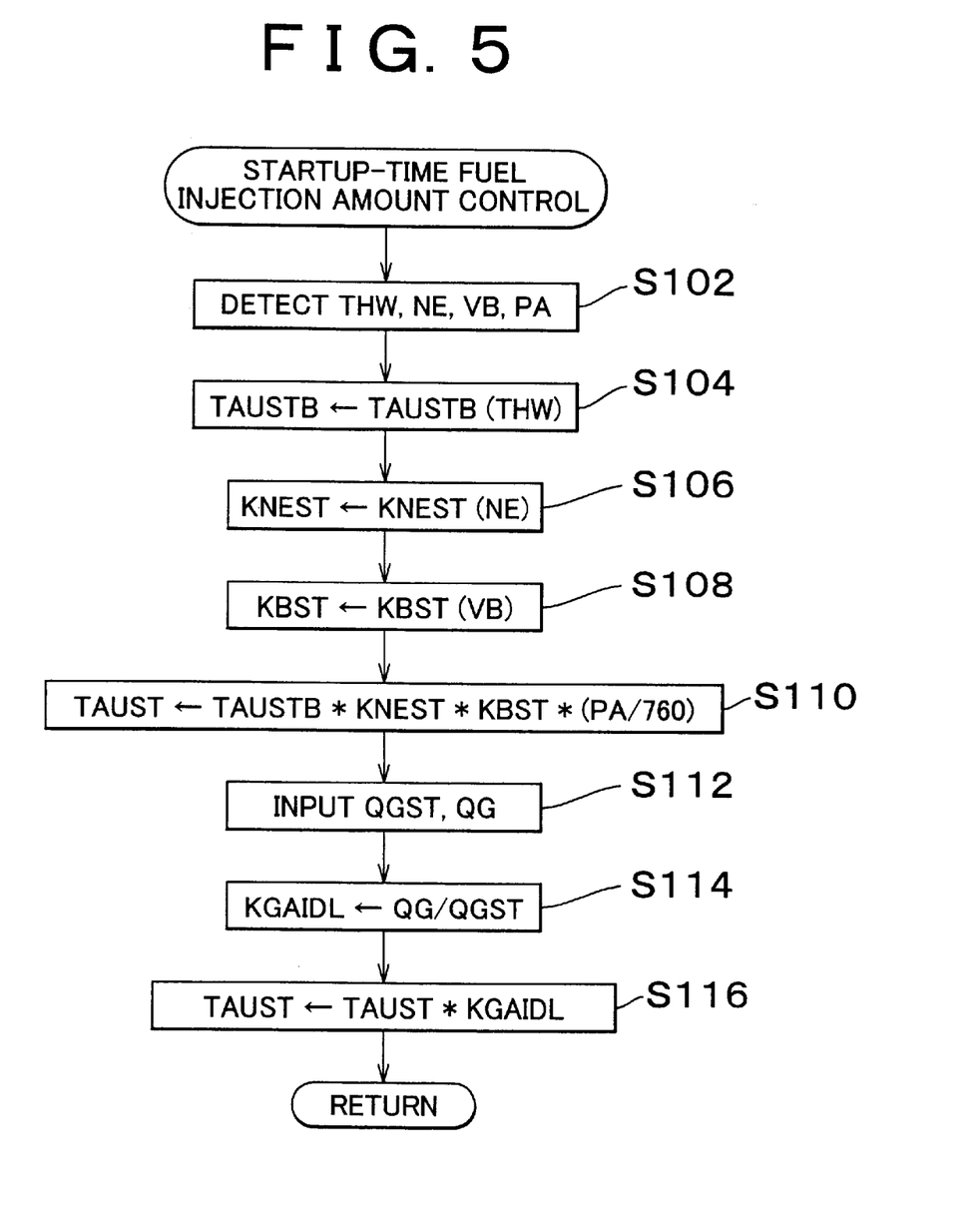
FIG. 5 is a flowchart illustrating a procedure of a startup-time fuel injection amount control in accordance with an embodiment of the invention.
Figure 6:
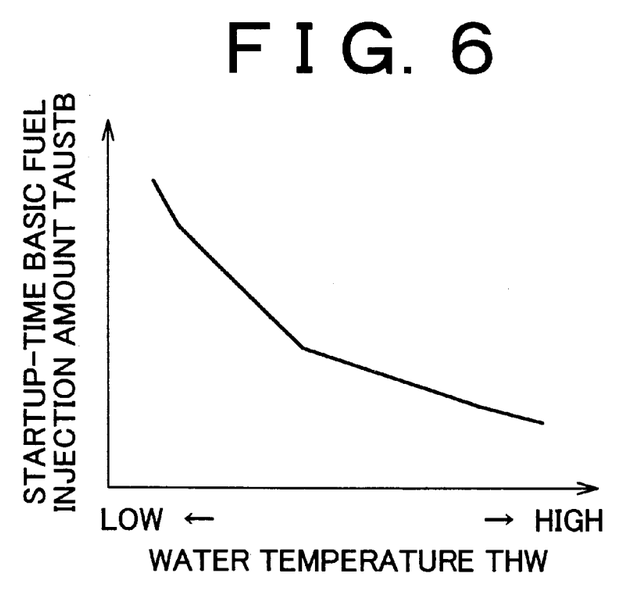
FIG. 6 is a diagram indicating a map for determining a startup-time basic fuel injection amount TAUSTB based on the engine cooling water temperature THW.
Figure 7:
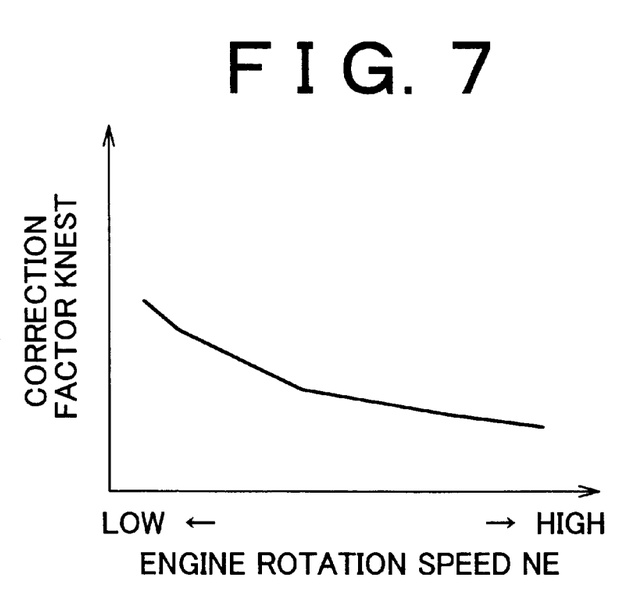
FIG. 7 is a diagram indicating a map for determining a correction factor KNEST for correcting the startup-time basic fuel injection amount TAUSTB in accordance with the engine rotation speed NE.
Figure 8:
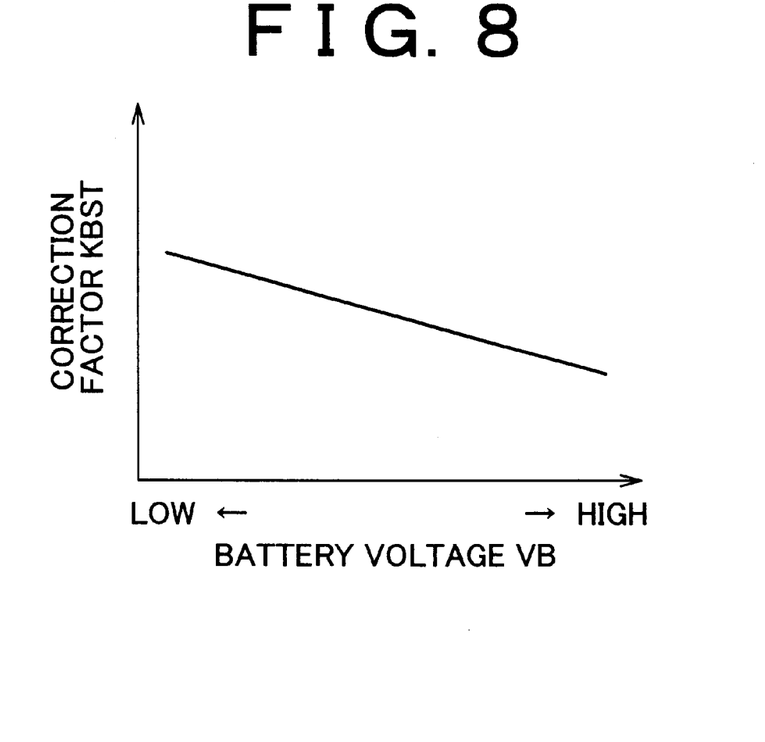
FIG. 8 is a diagram indicating a map for determining a correction factor KBST for correcting the startup-time basic fuel injection amount TAUSTB in accordance with the battery voltage VB.

FIG. 5 is a flowchart illustrating a procedure of a startup-time fuel injection amount control in accordance with an embodiment of the invention. FIGS. 6, 7 and 8 indicate maps that are referred to during the control. FIG. 6 indicates a map for determining a startup-time basic fuel injection amount (expressed as the duration of injection from the injector) TAUSTB based on the engine cooling water temperature THW. FIG. 7 indicates a map for determining a correction factor KNEST for correcting the startup-time basic fuel injection amount TAUSTB in accordance with the engine rotation speed NE. FIG. 8 indicates a map for determining a correction factor KBST for correcting the startup-time basic fuel injection amount TAUSTB in accordance with the battery voltage VB.

The routine illustrated in FIG. 5 is executed in a predetermined cycle at the time of a startup of an internal combustion engine, that is, when the switch signal from a starter (not shown) is on and the rotation speed of the engine is less than or equal to a predetermined value (e.g., 400 rpm) First in step 102, the engine cooling water temperature THW, the engine rotation speed NE, the battery voltage VB and the atmospheric pressure PA are detected based on the outputs from the water temperature sensor 74, the crank angle sensor 81, the battery voltage sensor 76 and the atmospheric pressure sensor 77, respectively.

Subsequently in step 104, a startup-time basic fuel injection amount TAUSTB is determined from the detected engine cooling water temperature THW with reference to the map of FIG. 6. Since the vaporization of fuel attached to the wall surface of the intake manifold becomes less likely as the engine is colder, the startup-time basic fuel injection amount TAUSTB is greater at lower temperatures of the engine in the map of FIG. 6.

Subsequently in step 106, a correction factor KNEST is determined from the detected engine rotation speed NE with reference to the map of FIG. 7. Normally, as the engine rotation speed increases, the intake pipe negative pressure increases and the air density decreases. Therefore, in the map of FIG. 7, the correction factor KNEST decreases as the engine rotation speed NE increases.

Subsequently in step 108, a correction factor KBST is determined from the battery voltage VB with reference to the map of FIG. 8. Normally, the duration needed for fuel injection from the injector increases as the battery voltage decreases. In the map of FIG. 8, therefore, the correction factor KBST increases as the battery voltage VB decreases.

Subsequently in step 110, the startup-time fuel injection amount TAUST independent of the startup-time amount of air is determined as follows:

$$TAUST \leftarrow TAUSTBX*KNEST*KBST*(PA/760)$$

where PA/760 is a correction factor based on the atmospheric pressure. In this invention, a further correction is performed in order to reflect a change in the startup-time amount of air.

That is, in step 112, the present post-warm-up idling-time required amount of air QG and the new vehicle-stage post-warm-up idling-time required amount of air QGST determined in the above-described idling rotation speed control are input. Subsequently in step 114, a correction factor KGAIDL for offsetting the change in the idling-time required amount of air is determined as follows:

$$KGAIDL \leftarrow QG/QGST$$

Figure 9:
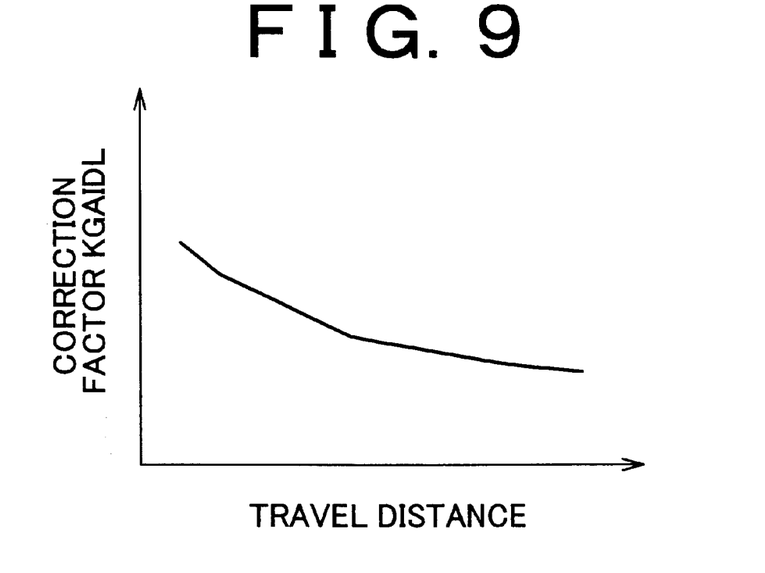
FIG. 9 is a diagram indicating changes in the correction factor KGIDL with respect to the cumulative travel distance based on changes in the post-warm-up idling-time required amount of air.

If the post-warm-up idling-time required amount of air QG relevant to the startup-time amount of air decreases as the cumulative travel distance increases as indicated in FIG. 2, the correction factor KGAIDL also decreases with increases in the cumulative travel distance as indicated in FIG. 9. Therefore, a constant air-fuel ratio at the time of startup can be maintained by correcting the startup-time fuel injection amount via the correction factor KGAIDL.

That is, in the final step 116, a startup-time fuel injection amount TAUST factoring in a change in the startup-time amount of air as well is determined as follows:

$$TAUST \leftarrow TAUST*KGAIDL$$

While the invention has been described with reference to what is presently considered to be a preferred embodiment thereof, it is to be understood that the invention is not limited to the disclosed embodiment or constructions. To the contrary, the invention is intended to cover various modifications and equivalent arrangements. For example, although in the embodiment, the post-warm-up startup-time amount of air QGST in the new-vehicle condition is determined through the learning during execution of the idling rotation speed control, it is also possible to determine standard values beforehand separately for vehicle models and engine types.

As described above, according to the embodiment of the invention, the startup-time fuel injection amount is corrected in accordance with changes in the amount of air at the time of startup of the internal combustion engine, so that the air-fuel ratio at the time of startup of the engine becomes stable and emissions reduce.

Nowadays, stabilization of the air-fuel ratio from a startup of an engine to the fast idling state is demanded in order to reduce emissions. According to the embodiment of the invention, since the startup-time fuel injection amount is set with high precision, the air-fuel ratio at the time of startup can be made stable, so that variations in the amount of emission can be reduced. Furthermore, the exhaust gas cleaning performance at the time of startup can be improved.

Normally, in a case where the startup-time air-fuel ratio is set in a post-endurance state with a great cumulative travel distance, the startup-time air-fuel ratio tends to be on the lean side during a new-vehicle condition (the cumulative travel distance being less than a predetermined value), so that problems, such as a startup failure and the like, may occur. According to the embodiment of the invention, however, an appropriate startup-time fuel injection amount can be set even in such a case, and the stable startup characteristic is secured.

What is claimed is:

1. A control apparatus for controlling an amount of fuel injected into an internal combustion engine, comprising a controller:

that corrects an amount of air introduced into the internal combustion engine at a startup time of the internal combustion engine based on a required amount of air that is an amount of air needed to maintain a predetermined value of rotation speed of the internal combustion engine during an idling operation after a warm-up of the internal combustion engine; and that computes the amount of fuel injected into the internal combustion engine at the startup time of the internal combustion engine based on a predetermined startup-time engine operation state that is other than an amount of air introduced into the internal combustion engine; and that corrects the amount of fuel injected into the internal combustion engine at the startup time based on a ratio between a present required amount of air and a required amount of air under a new-vehicle condition.

2. A control apparatus for controlling an amount of fuel injected into an internal combustion engine, comprising a controller:

that determines a required amount of air introduced into the internal combustion engine, the required amount of air being an amount of air needed to maintain a predetermined value of rotation speed of the internal combustion engine during an idling operation after a warm-up of the internal combustion engine; and that controls the amount of air introduced into the internal combustion engine at a startup time of the internal combustion engine in accordance with the required amount of air; and that controls the amount of fuel injected into the internal combustion engine at the startup time of the internal combustion engine based on at least the required amount of air;

wherein the controller corrects the amount of fuel injected at the startup time of the internal combustion engine based on a ratio of a present required amount of air and a required amount of air in an early stage in accumulation of travel distance of a vehicle.

3. The control apparatus according to claim 2, wherein the required amount of air decreases as a cumulative travel distance of a vehicle increases, and wherein the controller reduces the amount of fuel injected as the required amount of air decreases.

4. The control apparatus according to claim 2, wherein the controller computes the amount of fuel injected into the internal combustion engine based on a startup-time internal combustion engine state that is other than the amount of air introduced into the internal combustion engine, and corrects the amount of fuel injected based on the required amount of air.

5. The control apparatus according to claim 2, wherein the controller stabilizes an air-fuel ratio at the startup time of the internal combustion engine by controlling the amount of air introduced into the internal combustion engine and the amount of fuel injected based on the required amount of air.

6. A control method for controlling an amount of fuel injected into an internal combustion engine, comprising:

determining a required amount of air introduced into the internal combustion engine, the required amount of air being an amount of air being needed to maintain a predetermined value of rotation speed of the internal combustion engine during an idling operation after a warm-up of the internal combustion engine; and controlling the amount of air introduced into the internal combustion engine at a startup time of the internal combustion engine in accordance with the required amount of air;

controlling the amount of fuel injected into the internal combustion engine at the startup time of the internal combustion engine based on at least the required amount of air; and correcting the amount of fuel injected at the startup time of the internal combustion engine based on a ratio of a present required amount of air and a required amount of air in an early stage in accumulation of travel distance of a vehicle.

7. The control method according to claim 6, wherein the required amount of air decreases as a cumulative travel distance of a vehicle increases, and wherein the amount of fuel injected is reduced as the required amount of air decreases.

8. The control method according to claim 6, further comprising:

computing the amount of fuel injected into the internal combustion engine based on a startup-time internal combustion engine state that is other than the amount of air introduced into the internal combustion engine; and correcting the amount of fuel injected based on the required amount of air.

9. The control method according to claim 6, further comprising stabilizing an air-fuel ratio at the startup time of the internal combustion engine by controlling the amount of air introduced into the internal combustion engine and the amount of fuel injected based on the required amount of air.

* * * * *